US012671127B2

(12) United States Patent
Chi et al.

(10) Patent No.: US 12,671,127 B2
(45) Date of Patent: Jun. 30, 2026

(54) TOP COOLING TYPE BATTERY PACK

(71) Applicant: LG Energy Solution, Ltd., Seoul (KR)

(72) Inventors: Ho-June Chi, Daejeon (KR); Kyung-Mo Kim, Daejeon (KR); Jin-Yong Park, Daejeon (KR); Jhin-ha Park, Daejeon (KR); Jung-Hoon Lee, Daejeon (KR); Hee-Jun Jin, Daejeon (KR); Jeong-O Mun, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 626 days.

(21) Appl. No.: 17/628,384

(22) PCT Filed: Aug. 5, 2020

(86) PCT No.: PCT/KR2020/010355
§ 371 (c)(1),
(2) Date: Jan. 19, 2022

(87) PCT Pub. No.: WO2021/025473
PCT Pub. Date: Feb. 11, 2021

(65) Prior Publication Data
US 2022/0285755 A1     Sep. 8, 2022

(30) Foreign Application Priority Data
Aug. 7, 2019     (KR) ........................ 10-2019-0096284

(51) Int. Cl.
*H01M 10/6551*     (2014.01)
*H01M 10/613*      (2014.01)
(Continued)

(52) U.S. Cl.
CPC ..... *H01M 10/6551* (2015.04); *H01M 10/613* (2015.04); *H01M 50/264* (2021.01);
(Continued)

(58) Field of Classification Search
CPC ........... H01M 10/6551; H01M 10/613; H01M 50/296; H01M 50/264; H01M 50/533; H01M 50/271
See application file for complete search history.

(56) References Cited

U.S. PATENT DOCUMENTS

2012/0263988 A1 * 10/2012 Obasih ................... B60L 50/66
                                                           429/98
2012/0268069 A1     10/2012 Park et al.
                               (Continued)

FOREIGN PATENT DOCUMENTS

EP          3345779 A1     7/2018
EP          3460871 A1     3/2019
                  (Continued)

OTHER PUBLICATIONS

Extended European Search Report for Application No. 20849605.9 dated Dec. 23, 2022. 10 pgs.
(Continued)

*Primary Examiner* — Brian R Ohara
*Assistant Examiner* — Emily Elizabeth Freeman
(74) *Attorney, Agent, or Firm* — Lerner David LLP

(57)                         ABSTRACT

According to the present disclosure, there is provided a battery pack. The battery pack may include a pack case having a pack tray configured to support a lower portion of battery modules. A pack cover may be configured to cover the battery modules and contact a top surface of the battery modules. A heatsink may be installed at an upper portion of the pack cover.

13 Claims, 6 Drawing Sheets

(51) Int. Cl.
H01M 50/264 (2021.01)
H01M 50/271 (2021.01)
H01M 50/296 (2021.01)
H01M 50/533 (2021.01)

(52) U.S. Cl.
CPC ....... H01M 50/271 (2021.01); H01M 50/296 (2021.01); H01M 50/533 (2021.01)

(56) References Cited

U.S. PATENT DOCUMENTS

| | | | |
|---|---|---|---|
| 2014/0186675 A1* | 7/2014 | Boettcher | H01M 50/213 |
| | | | 429/99 |
| 2015/0236314 A1 | 8/2015 | Lee et al. | |
| 2015/0243946 A1 | 8/2015 | Ahn | |
| 2016/0301117 A1* | 10/2016 | Tyler | H01M 10/0525 |
| 2017/0187084 A1 | 6/2017 | Park et al. | |
| 2017/0267089 A1 | 9/2017 | Sugizaki et al. | |
| 2017/0279096 A1* | 9/2017 | Hasegawa | H01M 10/48 |
| 2018/0069275 A1* | 3/2018 | Ito | H01M 50/211 |
| 2018/0130991 A1 | 5/2018 | Kim | |
| 2019/0267684 A1 | 8/2019 | Ryu et al. | |
| 2020/0044211 A1 | 2/2020 | Seo et al. | |
| 2020/0044213 A1 | 2/2020 | Park et al. | |
| 2020/0220128 A1 | 7/2020 | Kim et al. | |
| 2020/0243812 A1 | 7/2020 | Keum | |
| 2020/0411814 A1 | 12/2020 | Ju et al. | |

FOREIGN PATENT DOCUMENTS

| | | | |
|---|---|---|---|
| EP | 3664186 A1 | 6/2020 | |
| JP | 2002151025 A | 5/2002 | |
| JP | 2008112654 A | 5/2008 | |
| JP | 2013541314 A | 11/2013 | |
| JP | 2016025037 A | 2/2016 | |
| JP | 2017112032 A | 6/2017 | |
| JP | 6255438 B2 | 12/2017 | |
| JP | 2019518313 A | 6/2019 | |
| KR | 20130073311 A | 7/2013 | |
| KR | 20130073582 A | 7/2013 | |
| KR | 20150096883 A | 8/2015 | |
| KR | 20150098831 A | 8/2015 | |
| KR | 20160050492 A | * | 5/2016 |
| KR | 20180038310 A | 4/2018 | |
| KR | 20180051208 A | 5/2018 | |
| KR | 20180091441 A | 8/2018 | |
| KR | 20190000210 A | 1/2019 | |
| KR | 20190040837 A | 4/2019 | |
| KR | 102065105 B1 | 1/2020 | |
| WO | 2018186581 A1 | 10/2018 | |
| WO | 2018236018 A1 | 12/2018 | |
| WO | 2019-107795 A1 | 6/2019 | |
| WO | 2019-124796 A1 | 6/2019 | |

OTHER PUBLICATIONS

Search Report dated Sep. 11, 2023 from the Office Action for Chinese Application No. 202080048384.8, issued Mar. Sep. 13, 2023, pp. 1-2.
International Search Report for PCT/KR2020/010355 dated Nov. 24, 2020. 3 pgs.

* cited by examiner

TOP COOLING TYPE BATTERY PACK

CROSS-REFERENCE TO RELATED APPLICATIONS

The present application is a national phase entry under 35 U.S.C. § 371 of International Application No. PCT/KR2020/010355 filed on Aug. 5, 2020, which claims priority to Korean Patent Application No. 10-2019-0096284 filed on Aug. 7, 2019, in the Republic of Korea, the entire disclosures of all of which are incorporated by reference herein.

TECHNICAL FIELD

The present disclosure relates to a battery pack, and more particularly, to a cooling and assembly structure of a battery pack.

BACKGROUND ART

A secondary battery refers to a battery that may be charged and discharged, unlike a primary battery that cannot be charged. The secondary battery is used as a power source not only for small high-tech electronics such as a mobile phone, a PDA or a laptop computer but also for an energy storage system (ESS), an electric vehicle (EV) or a hybrid electric vehicle (HEV).

Currently widely used secondary batteries include lithium ion batteries, lithium polymer batteries, nickel cadmium batteries, nickel hydrogen batteries, nickel zinc batteries, and the like. An operating voltage of a unit secondary battery cell, namely a unit battery cell, is about 2.5V to 4.2V. Therefore, if higher output voltage and greater energy capacity are required, a plurality of battery cells are connected in series to configure a battery module, or two or more battery modules are connected in series or in parallel and other components are added to configure a battery pack. For example, the battery module may refer to a device in which a plurality of secondary batteries are connected in series or in parallel, and the battery pack may refer to a device in which battery modules are connected in series or in parallel to increase capacity and output.

In addition to the battery modules, the battery pack may further include a cooling device for properly maintaining the temperature of the battery modules, a control device for monitoring the operating state of the battery modules, and a pack case for packaging them.

Meanwhile, in the case of a battery pack for an electric vehicle, since the installation space of the battery pack is limited depending on the overall length and width of the electric vehicle, it is important to increase the energy density by mounting battery modules and other components inside the pack case as space-efficiently as possible.

When assembling the battery pack, in the conventional case, as shown in FIG. 1, battery modules 2 are disposed on an upper surface of a pack tray 1, which corresponds to a bottom surface of the pack case, and a bolt is fastened to the pack tray 1 to mechanically fix the battery modules 2. In general, most battery modules 2 are fixed to the upper surface of the pack tray 1 by inserting long bolts in four locations at front and rear corners thereof. As an electrical connection structure between the battery modules, in many cases, both ends of an inter-bus bar 3 having a metal bar shape are placed on the upper surface of a positive electrode terminal 2a of one battery module 2 and a negative electrode terminal 2b of another battery module 2, and they are fixed using two bolts.

In addition, as a cooling configuration of the battery pack, in many cases, a heatsink 4 is installed on a bottom surface of the pack tray 1, and a cooling water supply pipe is connected thereto to circulate a cooling water into and out of the pack case.

However, some problems have recently been pointed out on the assembly structure of the conventional battery pack. Among them, the problems such as inefficiency of the assembly process and the increase in cost, caused by the use of too many bolts to fix the battery modules and the inter-bus bars, space loss as in the 'O' area of FIG. 1, energy density reduction caused by heatsink installation, leakage of a cooling water, and sealing reliability of sealing pipes and cooling ports are frequently pointed out.

Therefore, the development of a battery pack to which a cooling and assembly structure capable of solving the above problems is applied is becoming an issue.

DISCLOSURE

Technical Problem

The present disclosure is designed to solve the problems of the related art, and therefore the present disclosure is directed to providing a battery pack, which may eliminate a risk caused by leakage of a cooling, improve an energy density, and improve the efficiency of an assembly process.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, which includes a plurality of battery modules and a pack case for fixedly installing the battery modules therein, the battery pack comprising: a pack case having a pack tray configured to support a lower portion of the battery modules and a pack cover configured to cover the battery modules and contact a top surface of the battery modules; and a heatsink installed at an upper portion of the pack cover.

The heatsink may be provided integrally with the pack cover.

The heatsink may be configured to be mounted to a predetermined external structure in advance.

The pack cover may include a terminal connection unit provided to an inner surface of a top thereof to electrically connect electrode terminals of the battery modules.

The battery modules may be configured such that, when the upper portion of the battery modules is covered by the pack cover, an electrode terminal of any one battery module and an electrode terminal of another battery module adjacent thereto make contact with the terminal connection unit in upper and lower directions, respectively, to be electrically connected.

Each of the battery modules may include battery cells and a module case for accommodating the battery cells, and the electrode terminal may have a rectangular plate shape and be provided to protrude on one side of the module case.

The module case may include a terminal support formed to protrude on one side thereof to support a lower portion of the electrode terminal, the terminal support having a perforated hole formed in a vertical direction.

The pack cover may further include a mounting nut provided at the inner surface of the top thereof, and each battery module may be fixed to the pack cover by a mounting bolt that is inserted into the perforated hole of the terminal support and fastened to the mounting nut in a vertical direction.

At least one of the mounting bolt and the mounting nut may be made of an insulating material.

The terminal connection unit may include: an inter-bus bar configured to make a surface contact with the electrode terminal and having a fastening hole through which the mounting bolt passes; and a bracket member configured to support the inter-bus bar and fixedly coupled to the inner surface of the pack cover.

The bracket member may be shape-fitted with the mounting nut and attached to the inner surface of the pack cover.

The plurality of battery modules may be arranged in two rows such that electrode terminals thereof are disposed to face each other based on a center portion of the pack case.

In another aspect of the present disclosure, there is also provided a vehicle, comprising the battery pack described above. The vehicle may include an electric vehicle (EV) or a hybrid electric vehicle (HEV).

Advantageous Effects

According to an embodiment of the present disclosure, since the heatsink is installed outside the pack case, the battery pack is free from the risk of cooling water leakage, and it is possible to simplify the assembly structure inside the pack case and improve the energy density.

According to another embodiment of the present disclosure, the efficiency of the assembly process may be improved by mechanically fixing the battery modules in the pack case and integrating electrical connection structures.

Other effects of the present disclosure may be understood by the following description and will be more clearly figured out by the embodiments of the present disclosure.

DESCRIPTION OF DRAWINGS

Figures 6, 7:
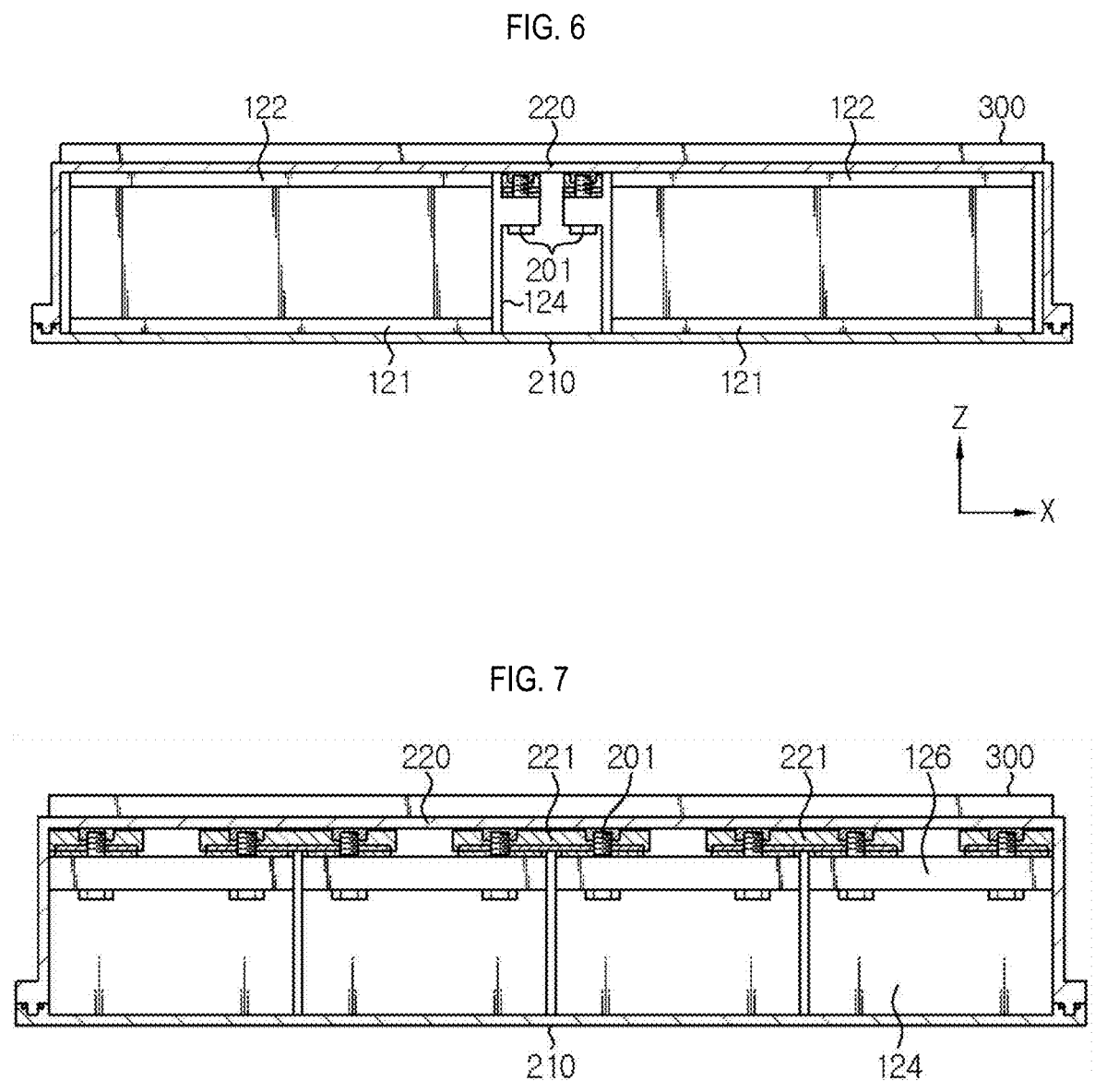

FIG. 6 is a schematic sectional view taken along the line II-II' of FIG. 2.

FIG. 7 is a schematic sectional view taken along the line III-III' of FIG. 2.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
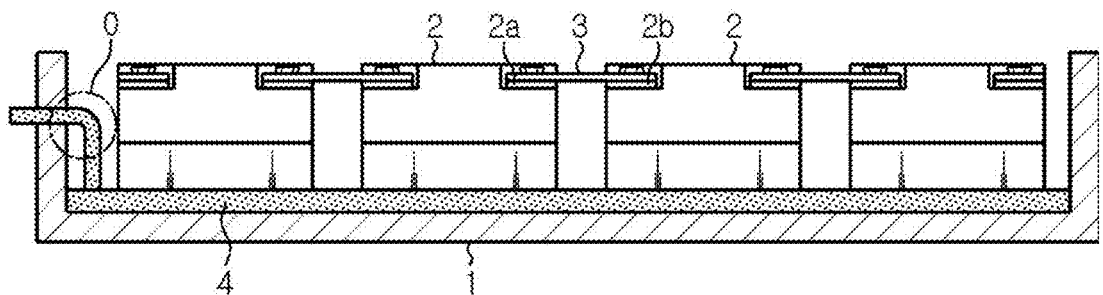
FIG. 1 is a diagram schematically showing a conventional battery pack.
Figure 2:
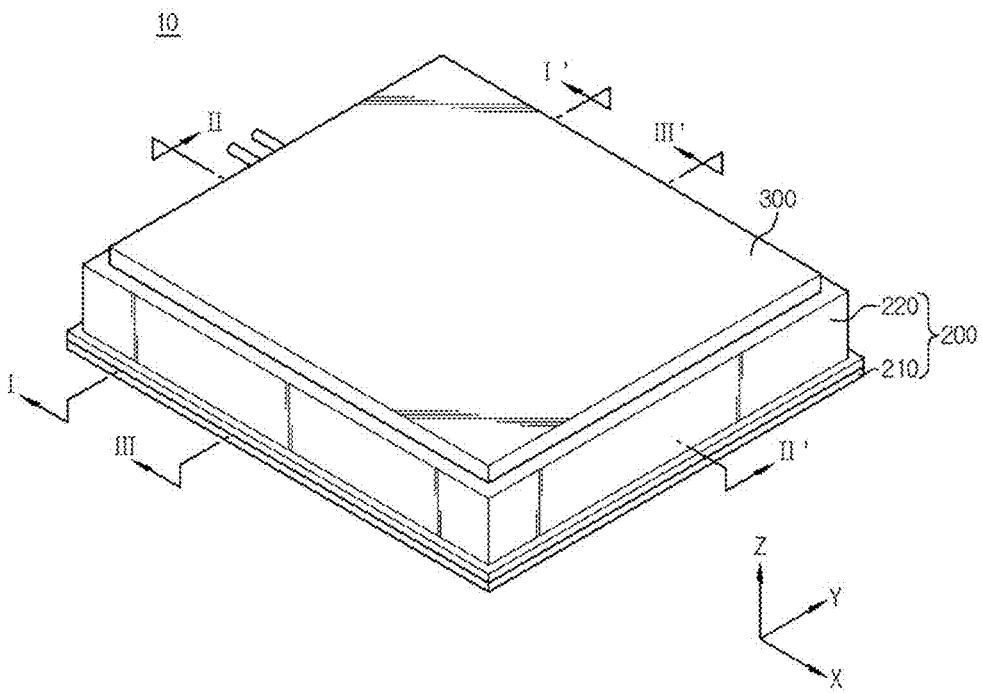
FIG. 2 is a perspective view schematically showing a battery pack according to an embodiment of the present disclosure.
Figure 3:
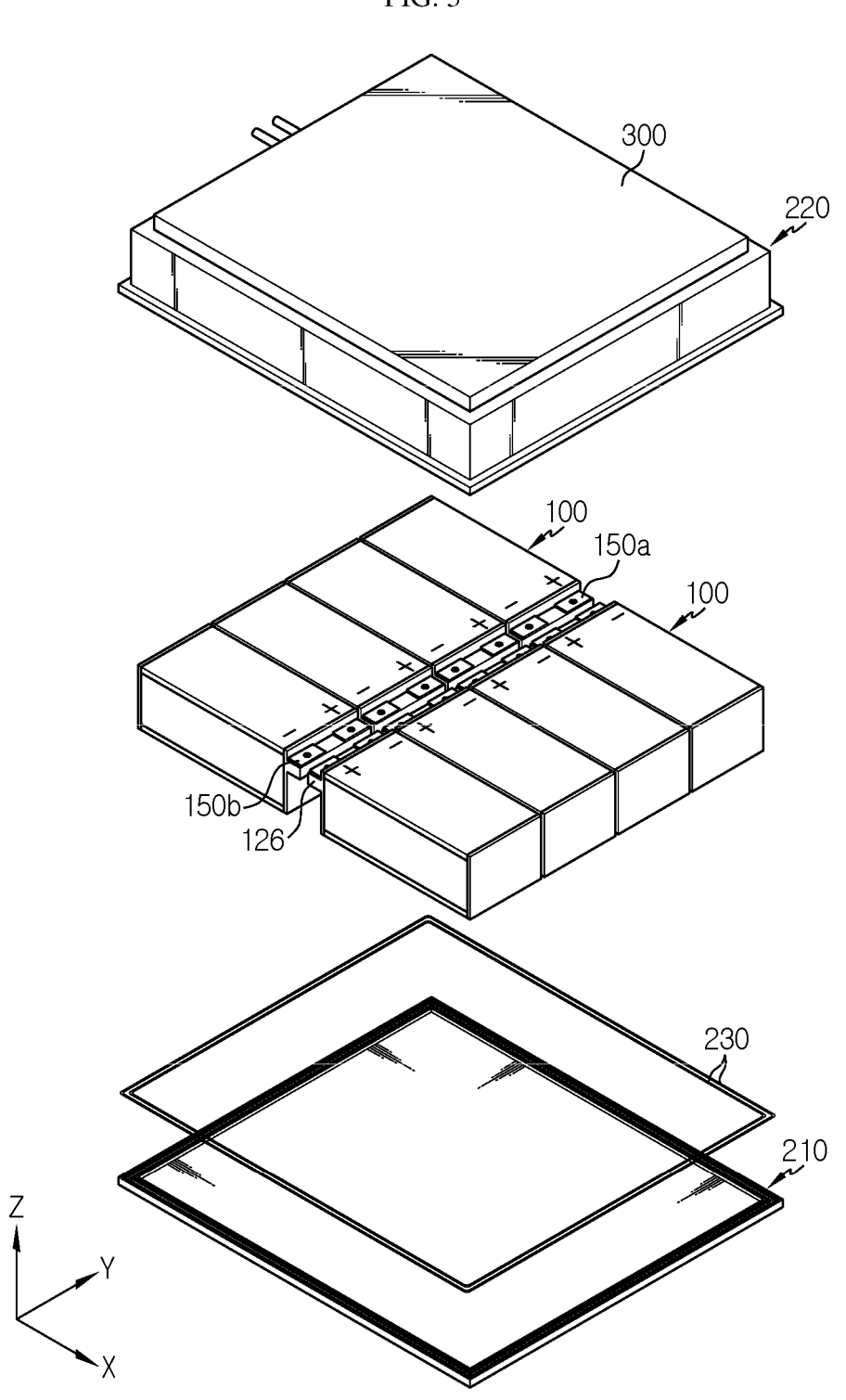
FIG. 3 is a partially exploded perspective view showing the battery pack of FIG. 2.
Figure 4:
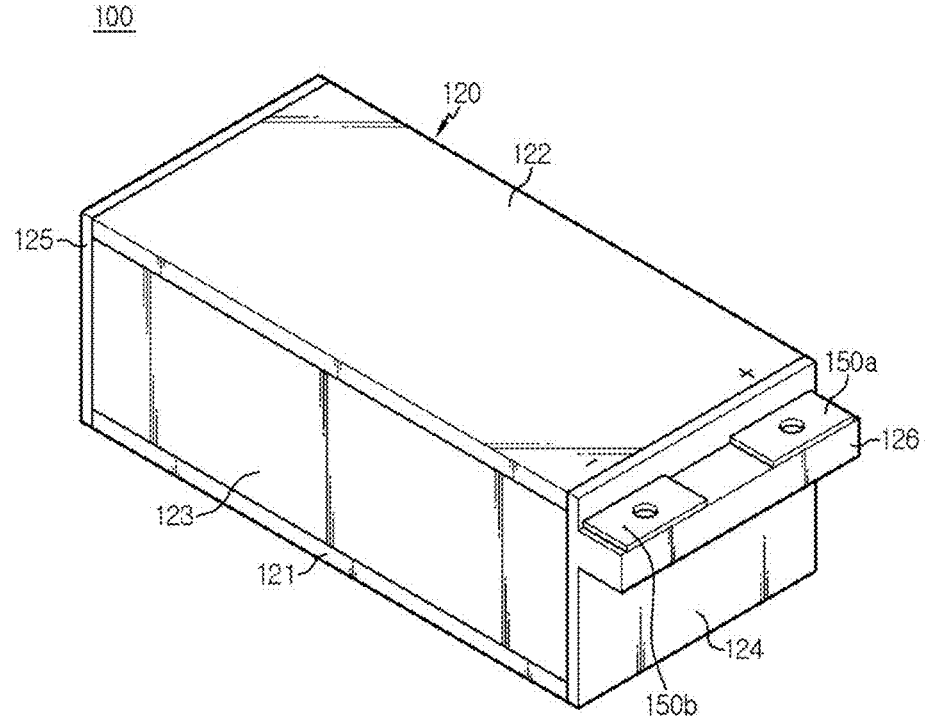
FIG. 4 is a perspective view schematically showing a battery module according to another embodiment of the present disclosure.

FIG. 2 is a perspective view schematically showing a battery pack according to an embodiment of the present disclosure, FIG. 3 is a partially exploded perspective view showing the battery pack of FIG. 2, and FIG. 4 is a perspective view schematically showing a battery module according to an embodiment of the present disclosure.

Referring to these drawings, a battery pack 10 according to an embodiment of the present disclosure includes a plurality of battery modules 100, a pack case 200 for accommodating the battery modules 100, and a heatsink 300 installed at an upper portion of the pack case 200.

As shown in FIGS. 2 and 3, the pack case 200 includes a pack tray 210 and a pack cover 220 coupled to each other. The pack tray 210 has a plate shape with a large area to support a lower portion of the battery modules 100, and the pack cover 220 is coupled to the pack tray 210 and configured to cover the entire battery modules 100.

In particular, as will be described later, battery cells 110 are electrically connected and mechanically fixed simultaneously by means of a terminal connection unit 221 provided to an inner surface of a top of the pack cover 220.

Among main components constituting the battery pack 10, a heatsink 300 corresponding to a cooling configuration will be described first, and then an internal assembly structure of the battery pack 10 will be described later.

The heatsink 300 of this embodiment has a flow path (not shown) through which a coolant may circulate. The coolant flowing in the flow path is not particularly limited as long as it flows easily in the flow path and has excellent cooling properties.

The heatsink 300 is located at an outer surface of the top of the pack cover 220. In other words, in the battery pack 10 of the present disclosure, since the heatsink 300 is provided outside the pack case 200, an electrical element and a cooling element are separated. Therefore, the heatsink 300 is free from the risk of cooling water leakage caused by external shock. In addition, since the heatsink 300 disappears from the inside of the pack case 200, it is possible to simplify the assembly structure and increase the energy density.

By installing the heatsink 300 at the top of the pack cover 220, the heatsink 300 may be manufactured separately from the pack cover 220 and then placed and fixed on the pack cover 220. However, in this case, due to the difference in surface roughness between the heatsink 300 and the pack cover 220, the thermal contact resistance is large, which may deteriorate the cooling efficiency.

Therefore, in this embodiment, the pack cover 220 and the heatsink 300 are configured in an integrated form. For example, heatsink 300 may be regarded as being integrated as a part of the pack cover 220 to minimize the thermal contact resistance and the heat conduction path. As the pack cover 220 integrated with the heatsink 300 absorbs heat inside the pack case 200, the cooling performance may not be deteriorated even if the heatsink 300 is outside the pack case 200.

As an alternative of this embodiment, a thermal interface material (TIM) may be placed on the outer surface of the top of the pack cover 220, and the heatsink 300 may placed thereon. The TIM fills a gap between the pack cover 220 and the heatsink 300 to reduce the thermal contact resistance. As the TIM, a thermal pad or resin with high thermal conductivity may be used.

Figure 5:
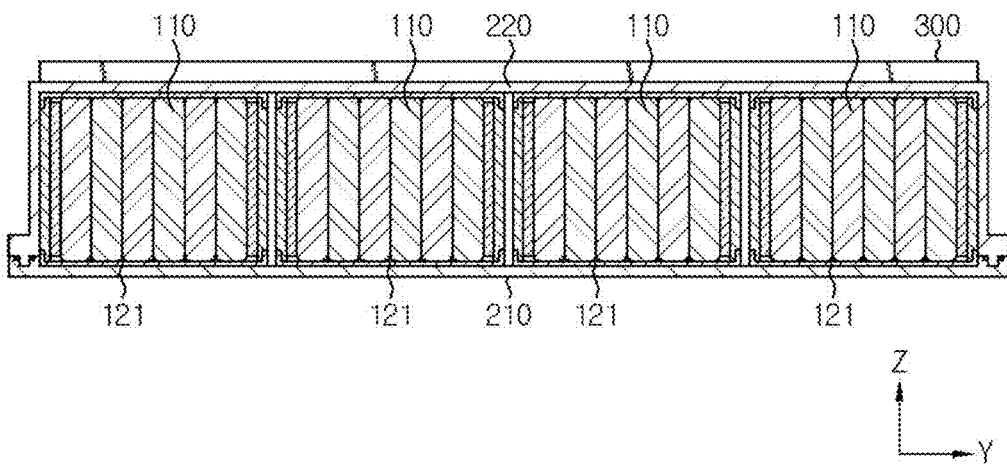
FIG. 5 is a schematic sectional view taken along the line I-I' of FIG. 2.

As shown in FIGS. 4 and 5, each battery module 100 accommodated in the pack case 200 includes battery cells 110, a module case 120 for accommodating the battery cells 110 in an inner space thereof, and electrode terminals 150*a*, 150*b* provided to the module case 120 to be exposed to the outside.

The battery cells 110 are pouch-type secondary battery cells widely known in the art. The pouch-type secondary batteries may be stacked in the inner space of the module case 120, which is advantageous in increasing energy density. Of course, the battery cell 110 is not necessarily limited to the pouch-type battery cell 110. For example, it is possible to use a cylindrical secondary battery cell or a prismatic secondary battery cell instead of the pouch-type secondary battery cell.

The module case 120 may include a base plate 121 and a top plate 122 for covering lower and upper portions of the battery cells 110, respectively, a pair of side plates 123 arranged at the outermost part of the battery cells 110 according to an arrangement direction thereof, and a front cover 124 and a rear cover 125 for covering front and rear sides of the battery cells 110, respectively.

The top plate 122 of the module case 120 may be provided to be in surface contact with an inner surface of the pack cover 220. A thermal pad may be further interposed between the top plate 122 and the inner surface of the pack cover 220.

The front cover 124 and the rear cover 125 are located at the front of the battery cells 110 so that the electrode leads of the battery cells 110 or components such as an inter connection board (ICB) are not exposed to the outside. The electrode terminals 150*a*, 150*b* include a positive electrode terminal 150*a* and a negative electrode terminal 150*b*, are located at an outer side of the top of the front cover 124 to have a rectangular plate shape so that its wide surface is placed horizontally, and have holes formed therein so that bolts may be inserted in upper and lower directions.

The electrode terminals 150*a*, 150*b* may be placed on and supported by a terminal support 126. Here, the terminal support 126 is a part protruding from the front cover 124 and may be used as a place where a lower portion of the electrode terminals 150*a*, 150*b* is supported and a bolt of the battery module 100 is fastened.

The terminal support 126 may be provided to extend along a width direction of the front cover 124, and in a place where the positive electrode terminal 150*a* and the negative electrode terminal 150*b* are located, one perforated hole into which a bolt may be inserted may be formed in a vertical direction. The perforated hole is not shown in the drawings, but may be formed to coincide with the hole of the electrode terminals 150*a*, 150*b* in upper and lower directions.

For reference, although the front cover 124 and the terminal support 126 are described separately, they may be manufactured in an integral type. In addition, although not shown, a perforated hole may be provided such that a mounting bolt 201 is inserted in another place where the electrode terminals 150*a*, 150*b* are not located. In this way, the mounting bolt 201 may be fastened to the pack cover 220.

The pair of side plate 123 may serve to compress and support the battery cells 110 from the outside at the outermost battery cell 110 along the arrangement direction of the battery cells 110.

Next, with reference to FIGS. 6 to 10, a mechanical fixing and electrical connection structure for each of the battery module 100, 100 inside the pack case 200 will be described in detail.

In this embodiment, eight battery modules 100 may be accommodated in total inside the pack case 200, namely four battery modules in each of two rows. At this time, the group of the battery modules 100 in the first row and the group of the battery modules 100 in the second row (see FIG. 3) may be located such that the electrode terminals 150*a*, 150*b* thereof face each other based on a center portion of the pack case 200. This arrangement of the battery modules 100 may be advantageous in minimizing the electrical connection distance between the battery modules 100. Of course, such an arrangement of the battery modules 100 is an example, and the total number or arrangement structure of the battery modules 100 may be changed as desired.

The eight battery modules 100 may be placed on the bottom of the pack tray 210 and supported thereby, and may be fixed to the terminal connection unit 221 provided at the inner surface of the top of the pack cover 220 by bolting. Moreover, the electrode terminals 150*a*, 150*b* of adjacent battery modules 100 may contact the terminal connection unit 221 to be electrically connected to each other.

For example, when the upper portion of the module case 120 is covered by the pack cover 220, the electrode terminals 150*a*, 150*b* of one battery module 100 and the electrode terminals 150*a*, 150*b* of another battery module 100 may be electrically connected to each other by making contact with the terminal connection unit 221 in upper and lower directions.

Figure 8:
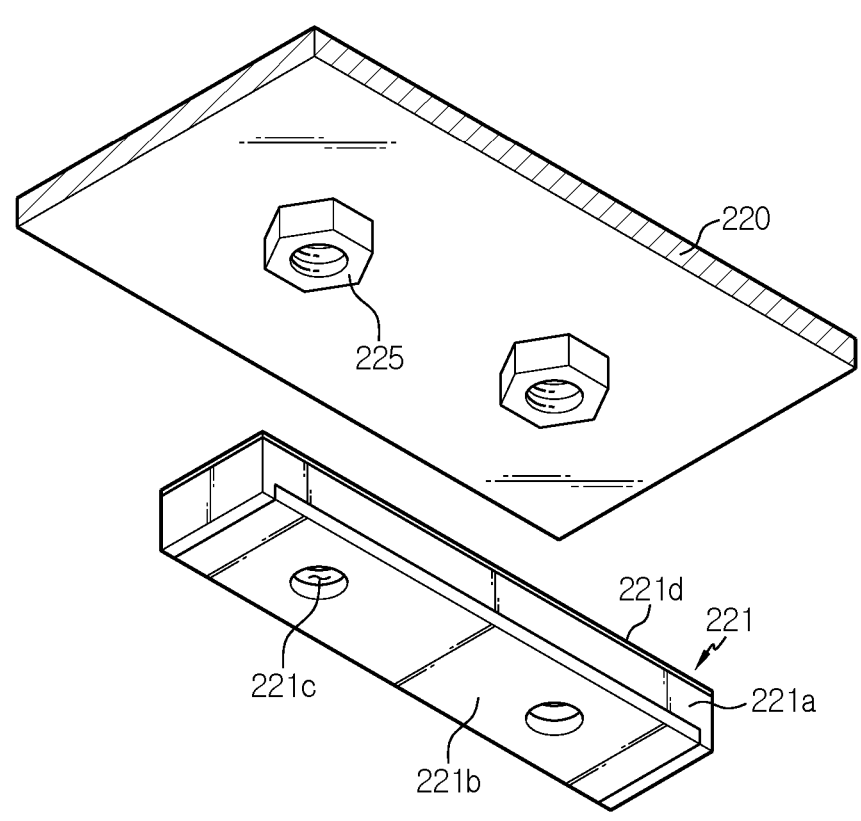
FIG. 8 is a schematic perspective view showing a terminal connection unit and a mounting nut according to an embodiment of the present disclosure.
Figure 9:
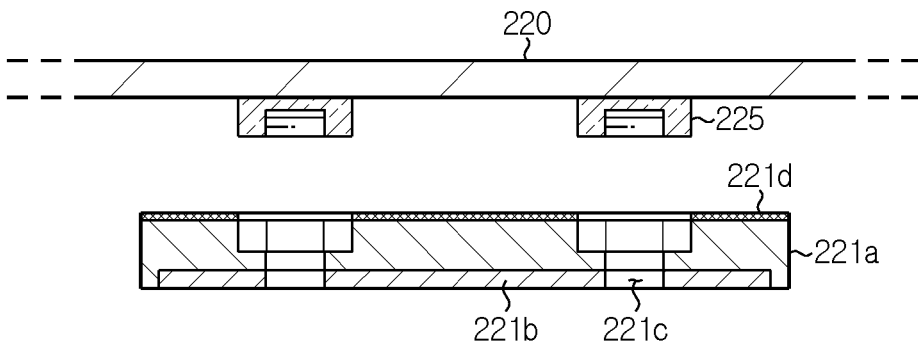
FIG. 9 is a sectional view of the terminal connection unit and the mounting nut of FIG. 8.

As shown in FIGS. 8 and 9, the pack cover 220 may further include a mounting nut 225 at an inner surface of the top thereof. The mounting nut 225 may be attached to the pack cover 220 in advance by welding. The terminal connection unit 221 is shape-fitted with the mounting nut 225 and be attached to the pack cover 220.

The terminal connection unit 221 has a metal bar-shaped inter-bus bar 221*b* having a fastening hole 221*c* through which the mounting bolt 201 may pass and making surface contact with the electrode terminals 150*a*, 150*b* of the battery module 100, and a bracket member 221*a* made of an insulating material that supports the inter-bus bar 221*b* and is fixedly coupled to the inner surface of the top of the pack cover 220.

The bracket member 221*a* has a rear surface shape-fitted with the mounting nut 225, and a front surface of the bracket member 221*a* is provided such that the inter-bus bar 221*b* is detachably attached thereto, so that the fastening hole 221*c* of the inter-bus bar 221*b* and the mounting nut 225 are coincided with each other in upper and lower directions.

The bracket member 221*a* may be simply attached to the pack cover 220 by attaching a both-sided adhesive tape 221*d* to a rear surface thereof. Of course, the bracket member 221*a* may also be attached in other ways, such as bolt and nut combination.

Figure 10:
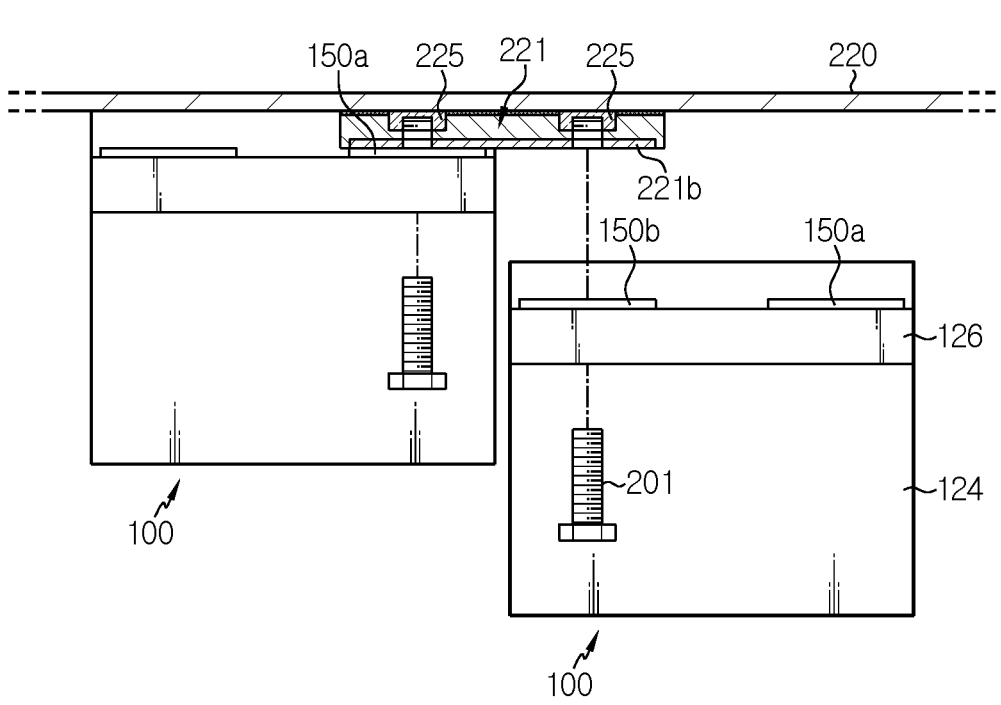
FIG. 10 is a diagram for illustrating a structure for fixing and electrically connecting battery modules of FIG. 4 according to an embodiment of the present disclosure.

With this configuration, as shown in FIG. 10, each battery module 100 may be fixed to the pack cover 220 by fastening the mounting bolt 201 to the mounting nut 225 from the perforated hole of the terminal support 126 through the holes of the electrode terminals 150*a*, 150*b* and the fastening hole 221*c* of the inter-bus bar 221*b*. At this time, two adjacent battery modules 100 may be electrically connected to each other because the positive electrode terminal 150*a* and the negative electrode terminal 150*b* contact the inter-bus bar 221*b* of the terminal connection unit 221, respectively.

At least one of the mounting bolt 201 and the mounting nut 225 may be an insulation bolt and an insulation nut. By using the insulation bolt and the insulation nut, a short circuit may be prevented even if the battery modules 100 are mechanically fixed and electrically connected to the pack cover 220 simultaneously.

As described above, the battery pack 10 of the present disclosure may be assembled very easily since the mechanical fixing and electrical connection structure of the battery modules 100 is integrated. In addition, by fixing each battery module 100 to the pack cover 220 instead of fixing the same on the pack tray 210 with bolts, the space utilization rate or the degree of freedom of the pack tray 210 may be improved.

An example where the battery pack 10 of the present disclosure is assembled will be described briefly as follows.

As for the battery pack 10 of the present disclosure, it is preferable to turn the pack cover 220 upside down, place the battery modules 100 therein, and then fix them, contrary to the assembly method of a general battery pack 10.

That is, in a state where the pack cover 220 is turned upside down, each battery module 100 is positioned so that the electrode terminals 150*a*, 150*b* of the battery module 100 face the cooling pipe of the pack cover 220 and the terminal connection unit 221, respectively.

After that, the mounting bolt 201 is fastened to a fastening part between each battery module 100 and the pack cover 220. That is, by placing each battery module 100 at a predetermined position and fastening the mounting bolt 201 thereto, the mechanical fixing work and the serial and/or parallel connection work of the battery modules 100 may be easily solved at once.

Then, an O-ring 230 is interposed in an uneven portion of the pack cover 220, and the uneven portion is fitted into an edge portion of the pack tray 210, thereby completing a main assembly process.

Figure 11:
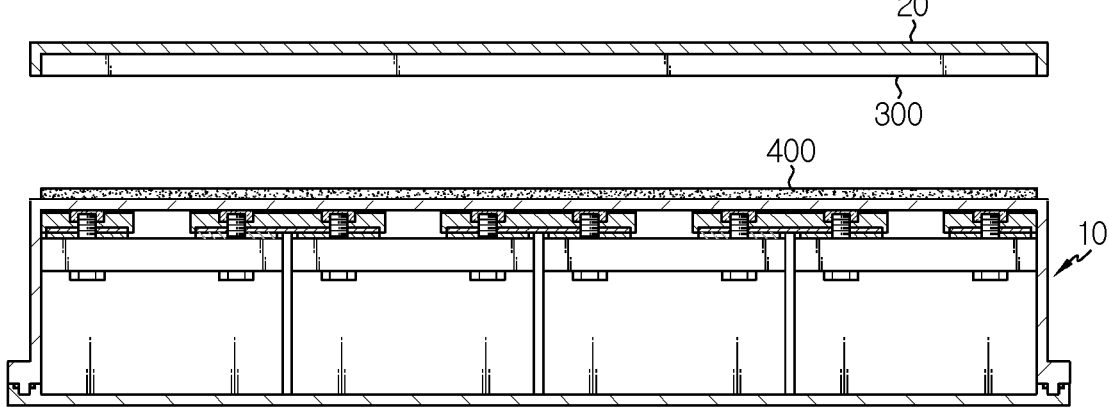
FIG. 11 is a diagram schematically showing a battery pack in conjunction with a chassis according to another embodiment of the present disclosure.

Next, a battery pack 10 according to another embodiment of the present disclosure will be briefly described with reference to FIG. 11.

The battery pack 10 according to this embodiment has the same basic mechanical and electrical assembly structure as the battery pack 10 of the former embodiment, but has a difference in the cooling configuration.

That is, in the former embodiment, the pack cover 220 and the heatsink 300 are integrated, but in this embodiment, the pack cover 220 and the heatsink 300 are provided in a separate type.

The heatsink 300 may be provided to be mounted to a predetermined external structure in advance. For example, an upper portion of the heatsink 300 is provided to be mounted to a chassis 20 of a vehicle, and a lower portion of the heatsink 300 is provided to face the upper surface of the pack cover 220. In addition, after the heatsink 300 is mounted to the vehicle chassis 20 in advance, the pack case 200 accommodating the remaining battery modules 100 is installed under the heatsink 300. In this case, a TIM 400 may be further provided on the upper surface of the pack cover 220.

According to this, since the electrical energy component and the cooling component of the battery pack 10 are completely separated, the structure of each component may be further simplified. In particular, since the heatsink 300 is provided to be mounted to a vehicle in advance, it may be easier to connect a cooling water pipe and secure sealing properties, which are required for the cooling configuration.

Meanwhile, the battery pack according to the present disclosure described above may further include various devices for controlling charging and discharging of the battery modules, such as a BMS, a current sensor and a fuse. The battery pack may be applied not only to vehicles such as electric vehicles or hybrid electric vehicles. Of course, the battery pack may be applied to energy storage systems or other IT products.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms expressing directions such as "upper", "lower", "left" and "right" are used in the specification, they are just for convenience of description and can be expressed differently depending on the location of a viewer or a subject, as apparent to those skilled in the art.

What is claimed is:

1. A battery pack comprising: a plurality of battery modules; a pack case having a pack tray and a pack cover, the pack tray configured to support a lower portion of the battery modules, the pack cover including an upper wall configured to contact and cover a top surface of the battery modules, the pack cover including side walls extending from the upper wall configured to cover side surfaces of the battery modules the pack case configured to receive and secure the battery modules therein, each battery module being disposed within and fully encased by a module case; and a heatsink disposed on an outer surface of the upper wall of the pack cover such that the pack case separates the heatsink from the plurality of battery modules, wherein the pack cover includes a terminal connection unit, the terminal connection unit being integrated into the pack cover to contact an inner surface of the upper wall, the terminal connection unit configured to electrically connect electrode terminals of the battery modules, each battery module including a top plate configured to contact the inner surface of the upper wall of the pack cover, and wherein the battery modules are electrically connected and mechanically fixed by the terminal connection unit.

2. The battery pack according to claim 1, wherein the heatsink is integral with the upper wall of the pack cover.

3. The battery pack according to claim 1, wherein the heatsink is configured to be mounted to an external structure.

4. The battery pack according to claim 1, wherein an electrode terminal of any one battery module of the plurality of battery modules and an electrode terminal of another battery module adjacent of the plurality of battery modules thereto make contact with the terminal connection unit in a first and a second directions, respectively, to be electrically connected when the battery modules are covered by the pack cover.

5. The battery pack according to claim 1, wherein each of the plurality of battery modules includes battery cells, each battery module including rectangular plate shaped electrode terminals protruding on one side of the module case.

6. The battery pack according to claim 5, wherein the module case includes a terminal support, the terminal support protruding on one side of the module case to support a lower portion of the electrode terminals, the terminal support having a hole extending therethrough.

7. The battery pack according to claim 6, wherein the pack cover further includes a mounting nut provided at the inner surface of the upper wall, each battery module being fixed to the pack cover by a mounting bolt inserted through the hole and secured to the mounting nut.

8. The battery pack according to claim 7, wherein at least one of the mounting bolt and the mounting nut is made of an insulating material.

9. The battery pack according to claim 7, wherein the terminal connection unit includes:

an inter-bus bar configured to contact the electrode terminals and having a fastening hole to receive the mounting bolt; and a bracket member configured to support the inter-bus bar, the bracket member fixedly coupled to the inner surface of upper wall of the pack cover.

10. The battery pack according to claim 9, wherein the bracket member is shape-fitted with the mounting nut and attached to the inner surface of the upper wall of the pack cover.

11. The battery pack according to claim 1, wherein the plurality of battery modules are arranged in two rows such that electrode terminals thereof are disposed to face each other.

12. A vehicle, comprising the battery pack according to claim 1.

13. A battery pack comprising:

a plurality of battery modules;

a pack case having a pack tray and a pack cover, the pack tray configured to support a lower portion of the battery modules, the pack cover including an upper wall configured to contact and cover a top surface of the battery modules, the pack cover including side walls extending from the upper wall configured to cover side surfaces of the battery modules, the pack case configured to receive and secure the battery modules therein, each battery module being disposed within and fully encased by a module case; and a heatsink disposed on an external surface of the upper wall of the pack cover, wherein the pack cover includes a terminal connection unit, the terminal connection unit being integrated into the pack cover to connect an inner surface of the upper wall, the terminal connection unit configured to electrically connect electrode terminals of the battery modules, each battery module including a top plate configured to contact the inner surface of the upper wall of the pack cover, and wherein the battery modules are electrically connected and mechanically fixed by the terminal connection unit.

* * * * *